US012676337B2

(12) United States Patent
Yoon et al.

(10) Patent No.: US 12,676,337 B2
(45) Date of Patent: Jul. 7, 2026

(54) ANODE FOR LITHIUM SECONDARY BATTERY AND METHOD FOR MANUFACTURING SAME

(71) Applicant: LG Energy Solution, Ltd., Seoul (KR)

(72) Inventors: Jong Su Yoon, Daejeon (KR); Taek Soo Lee, Daejeon (KR); Jin Ho Cho, Daejeon (KR); Shin Wook Jeon, Daejeon (KR); Young Gon Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 11 days.

(21) Appl. No.: 18/841,176

(22) PCT Filed: Oct. 25, 2023

(86) PCT No.: PCT/KR2023/016608
§ 371 (c)(1),
(2) Date: Aug. 23, 2024

(87) PCT Pub. No.: WO2024/111906
PCT Pub. Date: May 30, 2024

(65) Prior Publication Data
US 2025/0112262 A1     Apr. 3, 2025

(30) Foreign Application Priority Data
Nov. 25, 2022     (KR) ........................ 10-2022-0160838

(51) Int. Cl.
*H01M 10/0525*     (2010.01)
*H01M 4/02*     (2006.01)
(Continued)

(52) U.S. Cl.
CPC ..... *H01M 10/0525* (2013.01); *H01M 4/0404* (2013.01); *H01M 4/366* (2013.01);
(Continued)

(58) Field of Classification Search
None
See application file for complete search history.

(56) References Cited

U.S. PATENT DOCUMENTS

2011/0294009 A1     12/2011 Kawakami et al.
2019/0305293 A1*     10/2019 Sotowa ............. H01M 10/0562
(Continued)

FOREIGN PATENT DOCUMENTS

CN          111628141 A          9/2020
CN          113036298 A *     6/2021     ............ H01M 4/663
(Continued)

OTHER PUBLICATIONS

International Search Report for Application No. PCT/KR2023/016608 mailed Feb. 2, 2024, pp. 1-4.
(Continued)

*Primary Examiner* — Zhongqing Wei
(74) *Attorney, Agent, or Firm* — Lerner David LLP

(57)          ABSTRACT
Disclosed herein relates to a negative electrode for lithium secondary battery and a method for manufacturing the same. The negative electrode has a structure in which a first negative electrode active layer and a second negative electrode active layer are sequentially stacked on a negative electrode current collector. By controlling alignment (O.I) of the carbon-based active material to be lower in the second negative electrode active layer than in the first negative electrode active layer, and by preparing a low percentage of pores in the second negative electrode active layer, it is possible to have a flow path for the electrolyte to move inside the negative electrode active layer even after the rolling process of the negative electrode active layer. The negative electrode also has a high wetting ability to the electrolyte and high energy density.

4 Claims, 2 Drawing Sheets

100

(51) Int. Cl.

| | | |
|---|---|---|
| H01M 4/04 | (2006.01) | |
| H01M 4/36 | (2006.01) | |
| H01M 4/583 | (2010.01) | |

(52) U.S. Cl.

CPC ...... *H01M 4/583* (2013.01); *H01M 2004/021* (2013.01); *H01M 2004/027* (2013.01)

(56) References Cited

U.S. PATENT DOCUMENTS

| | | |
|---|---|---|
| 2019/0305308 A1 | 10/2019 | Lee et al. |
| 2020/0295351 A1 | 9/2020 | Piao et al. |
| 2021/0336244 A1 | 10/2021 | Kang et al. |
| 2022/0336810 A1 | 10/2022 | Hwang et al. |
| 2023/0123455 A1 | 4/2023 | Hu et al. |

FOREIGN PATENT DOCUMENTS

| | | | |
|---|---|---|---|
| EP | 4080604 A2 | | 10/2022 |
| JP | 2013069432 A | | 4/2013 |
| JP | 2015138644 A | | 7/2015 |
| KR | 20110131116 A | | 12/2011 |
| KR | 101249349 B1 | | 4/2013 |
| KR | 20180035693 A | | 4/2018 |
| KR | 20190042335 A | * | 4/2019 |
| KR | 20190062319 A | | 6/2019 |
| KR | 20210039599 A | | 4/2021 |
| KR | 20220059182 A | | 5/2022 |
| KR | 20220064389 A | | 5/2022 |
| KR | 20220144097 A | | 10/2022 |
| KR | 102536147 B1 | | 5/2023 |

OTHER PUBLICATIONS

Notification of Preliminary Examination Results for KR Application No. 10-2022-0160838, mailed Jan. 25, 2023, pp. 1-4.

Written Decision on Registration for KR Application No. 10-2022-0160838, dispatched on Apr. 19, 2023, pp. 1-3.

Extended European Search Report including Written Opinion for Application No. 23894835.0 dated Feb. 21, 2025. 18 pages.

\* cited by examiner

[FIG. 1]
100
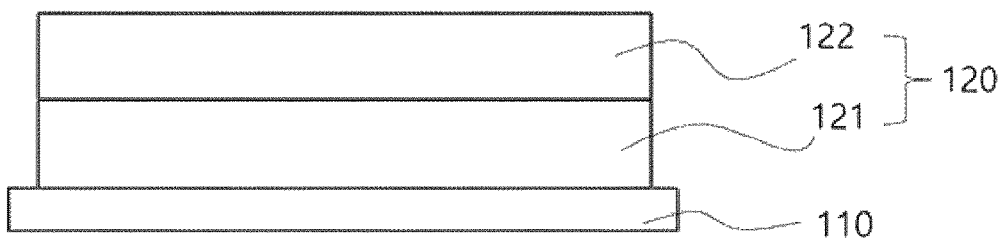
[FIG. 2]
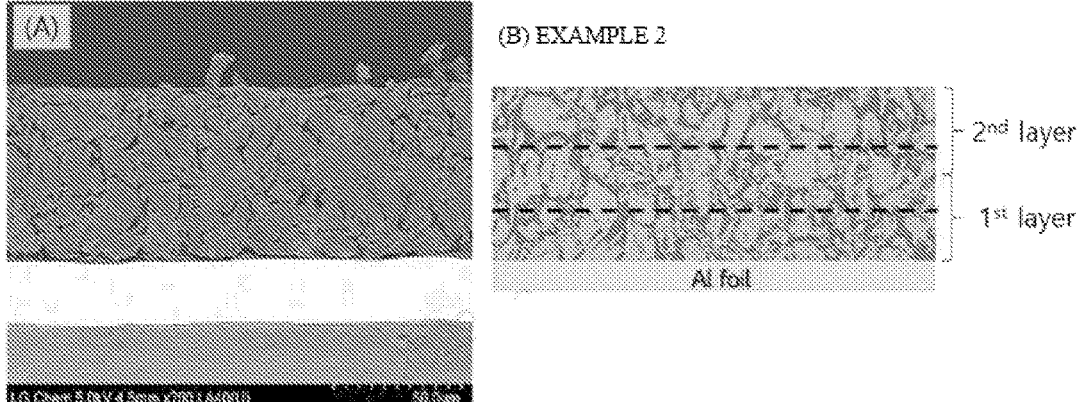

[FIG. 3]
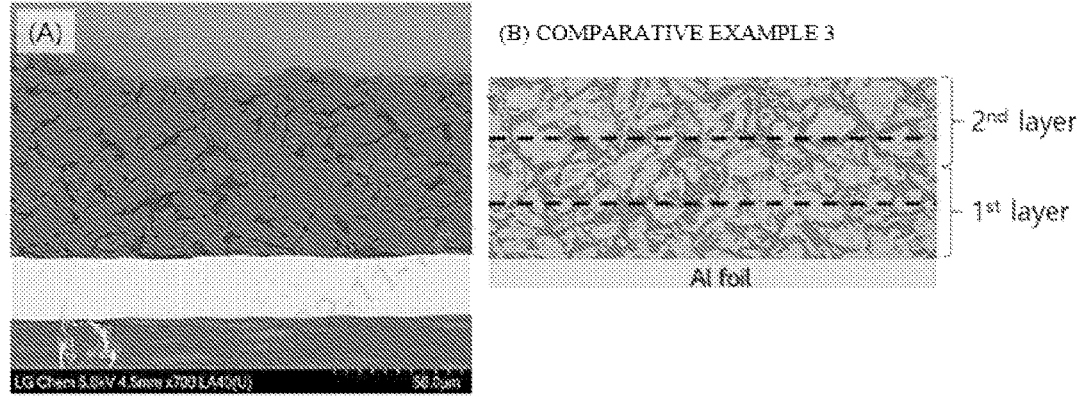

ANODE FOR LITHIUM SECONDARY BATTERY AND METHOD FOR MANUFACTURING SAME

CROSS-REFERENCE TO RELATED APPLICATIONS

This application is a national phase entry under 35 U.S.C. § 371 of International Application No. PCT/KR2023/016608, filed on Oct. 25, 2023, which claims the benefit of priority to Korean Patent Application No. 10-2022-0160838, filed on Nov. 25, 2022, the disclosures of which are incorporated herein by reference in its entirety.

TECHNICAL FIELD

The present disclosure relates to a negative electrode for lithium secondary battery and a method for manufacturing the same.

BACKGROUND TECHNOLOGY OF THE INVENTION

Recently, secondary batteries have been widely applied in small devices such as portable electronics, as well as in medium and large devices such as battery packs or power storage in hybrid vehicles or electric vehicles.

Such a secondary battery refers to a power generation element that can be charged and discharged by a laminated structure of a positive electrode/separator/negative electrode. Generally, the positive electrode includes lithium metal oxide as the positive electrode active material and the negative electrode includes a carbon-based negative electrode active material such as graphite, so that lithium ions discharged from the positive electrode are absorbed into the carbon-based negative electrode active material of the negative electrode during charging, and lithium ions contained in the carbon-based negative electrode active material are absorbed into the lithium metal oxide of the positive electrode during discharging, and charging and discharging are repeated.

Meanwhile, as a negative electrode active material for the negative electrode, amorphous carbon or crystalline carbon is being used, among which crystalline carbon is mainly utilized due to its higher capacity. Examples of crystalline carbon include natural graphite, synthetic graphite, and the like.

Natural graphite, compared to synthetic graphite, has a higher degree of graphitization and is cheaper, showing a higher lithium-ion storage capacity, which makes it advantageous. However, natural graphite may experience swelling due to the decomposition reaction of the electrolyte at its edges caused by its irregular structure, and its low wetting ability to the electrolyte can lead to reduced charge-discharge efficiency and capacity. Attempts have been made to solve these problems through spherization and surface coating treatment of natural graphite, but the developed technologies have limitations in improving electrical properties due to their low-price competitiveness or minimal improvement in wetting ability to the electrolyte.

DESCRIPTION

Technical Problem

The object of the present disclosure is to provide a negative electrode for lithium secondary battery and a method for manufacturing the same, which includes carbon-based active materials such as natural graphite, while also exhibiting excellent electrolyte wetting ability and high energy density.

Technical Solution

To solve the above-mentioned problems,

In an exemplary embodiment, the present disclosure provides a negative electrode for lithium secondary battery including:

a negative electrode current collector; a first negative electrode active layer provided on at least one surface of the negative electrode current collector and containing carbon-based active material; and a second negative electrode active layer provided on the first negative electrode active layer and containing carbon-based active material, wherein the alignment ($O.I_{1st}$) of the carbon-based active material in the first negative electrode active layer, represented by the following Equation 1, is greater than the alignment ($O.I_{2nd}$) of the carbon-based active material in the second negative electrode active layer, and the porosity of the second negative electrode active layer is from 15% to 25%:

$$O.I = I_{004}/I_{110} \qquad \text{[Equation 1]}$$

In Equation 1, $I_{004}$ represents the area of the peak representing the [0,0,4] crystal face in the X-ray diffraction (XRD) measurement of the negative electrode active layer, $I_{110}$ represents the area of the peak representing the [1,1,0] crystal face in an X-ray diffraction (XRD) measurement of the negative electrode active layer.

Here, the alignment ($O.I_{2nd}$) of the carbon-based active material contained in the second negative electrode active layer may be from 0.4 to 0.9.

In addition, the alignment ($O.I_{1st}$) of the carbon-based active material contained in the first negative electrode active layer may have a ratio of 105% to 150% to the alignment ($O.I_{2nd}$) of the carbon-based active material contained in the second negative electrode active layer.

Moreover, the total thickness of the first and second negative electrode active layers may be from 50 μm to 300 μm.

In addition, the second negative electrode active layer may have a BET specific surface area of 0.20 to 0.62 m²/g.

Furthermore, the negative electrode may satisfy the following Equation 2 when evaluating wetting ability to polycarbonate:

$$1 \le WT/O.I_{2nd} \le 16 \qquad \text{[Equation 2]}$$

In Equation 2,

WT represents the time (unit: seconds) it takes for 1 drop (2-5 μl) of polycarbonate to impregnate a unit area (1 cm×1 cm) of the negative electrode, and $O.I_{2nd}$ represents the alignment of the carbon-based active material contained in the second negative electrode active layer.

In addition, the carbon-based active material may include at least one of natural graphite and synthetic graphite.

Furthermore, in an exemplary embodiment, the present disclosure provides a manufacturing method of a negative electrode for lithium secondary battery including:

applying a first negative electrode slurry containing carbon-based active material on a negative electrode current collector;

applying a second negative electrode slurry containing carbon-based active material on the applied first negative electrode slurry;

applying a magnetic field to the first and second negative electrode slurries; and drying the first and second negative electrode slurries applied with a magnetic field to form the first and second negative electrode active layers, wherein the alignment ($O.I_{1st}$) of the carbon-based active material in the first negative electrode active layer formed, represented by the following Equation 1, is greater than the alignment ($O.I_{2nd}$) of the carbon-based active material in the second negative electrode active layer, and the porosity of the second negative electrode active layer is from 15% to 25%:

$$O.I = I_{004}/I_{110} \qquad \text{[Equation 1]}$$

In Equation 1, $I_{004}$ represents the area of the peak representing the [0,0,4] crystal face in the X-ray diffraction (XRD) measurement of the negative electrode active layer, $I_{110}$ represents the area of the peak representing the [1,1,0] crystal face in an X-ray diffraction (XRD) measurement of the negative electrode active layer.

Here, applying a magnetic field may involve applying a magnetic field of 2,000G to 6,000G.

In addition, applying a magnetic field may be performed for 5 to 60 seconds.

Moreover, forming the first and second negative electrode active layers may include:

drying the first and second negative electrode slurries; and rolling the dried first and second negative electrode slurries.

Advantageous Effects

A negative electrode for lithium secondary battery according to the present disclosure has a structure in which a first negative electrode active layer and a second negative electrode active layer are sequentially stacked on a negative electrode current collector. By controlling alignment (O.I) of the carbon-based active material to be lower in the second negative electrode active layer than in the first negative electrode active layer, and by preparing a low percentage of pores in the second negative electrode active layer, it is possible to have a flow path for the electrolyte to move inside the negative electrode active layer even after the rolling process of the negative electrode active layer, so it is advantageous in that a high wetting ability to the electrolyte and high energy density can be implemented.

BRIEF DESCRIPTION OF THE DRAWINGS

FIG. 1 is a schematic cross-sectional view showing the structure of a negative electrode for lithium secondary battery according to the present disclosure.

FIG. 2 and FIG. 3 are images of the cross-sections of the negative electrodes manufactured in Example 2 and Comparative Example 3 analyzed by Fourier-transform scanning electron microscopy-energy dispersive spectrometer (FT-SEM/EDS), respectively, where (A) is a Fourier-transform scanning electron microscopy (FT-SEM) analysis photograph, and (B) is a photograph showing the pore state embedded in the negative electrode active layer by an elemental analysis of the carbon contained in the negative electrode active layer with an energy dispersive spectroscopy (EDS).

DETAILED DESCRIPTION

The present disclosure may have various modifications and various examples, and specific examples are illustrated in the drawings and described in detail in the description.

However, it should be understood that the present disclosure is not limited to specific embodiments, and includes all modifications, equivalents or alternatives within the spirit and technical scope of the present disclosure.

The terms "comprise," "include" and "have" are used herein to designate the presence of characteristics, numbers, steps, actions, components or members described in the specification or a combination thereof, and it should be understood that the possibility of the presence or addition of one or more other characteristics, numbers, steps, actions, components, members or a combination thereof is not excluded in advance.

In addition, when a part of a layer, a film, a region or a plate is disposed "on" another part, this includes not only a case in which one part is disposed "directly on" another part, but a case in which a third part is interposed there between. In contrast, when a part of a layer, a film, a region or a plate is disposed "under" another part, this includes not only a case in which one part is disposed "directly under" another part, but a case in which a third part is interposed there between. In addition, in this application, "on" may include not only a case of disposed on an upper part but also a case of disposed on a lower part.

In this invention, "comprising as a major component" means that the defined component constitutes more than 50 wt % (or more than 50 volume %), more than 60 wt % (or more than 60 volume %), more than 70 wt % (or more than 70 volume %), more than 80 wt % (or more than 80 volume %), more than 90% by weight (or more than 90 volume %), or more than 95 wt % (or more than 95 volume %) with respect to the total weight (or total volume). For example, "comprising graphite as a major component of the negative electrode active material" could mean that graphite constitutes more than 50 wt %, more than 60 wt %, more than 70 wt %, more than 80 wt %, more than 90 wt %, or more than 95 wt % with respect to the total weight of the negative electrode active material, and in some cases, the entire negative electrode active material could be made of graphite, meaning that graphite constitutes 100 wt %.

Furthermore, in the present disclosure, "mAh" represents the capacity unit of lithium secondary batteries, standing for "milliampere-hour," which indicates the amount of current over time. For instance, if a capacity of a battery is "3000 mAh," it means it can discharge with a current of 3000 mA for one hour.

Hereinafter, the present disclosure will be described in more detail.

Negative Electrode for Lithium Secondary Battery

In an exemplary embodiment, the present disclosure provides a negative electrode for lithium secondary battery including:

a negative electrode current collector; a first negative electrode active layer provided on at least one surface of the negative electrode current collector and containing carbon-based active material; and a second negative electrode active layer provided on the first negative electrode active layer and containing carbon-based active material, wherein the alignment ($O.I_{1st}$) of the carbon-based active material in the first negative electrode active layer, represented by the following Equation 1, is greater than the alignment ($O.I_{2nd}$) of the carbon-based active material in the second negative electrode active layer, and the porosity of the second negative electrode active layer is from 15% to 25%:

$$O.I = I_{004}/I_{110} \qquad \text{[Equation 1]}$$

In Equation 1, $I_{004}$ represents the area of the peak representing the [0,0,4] crystal face in the X-ray diffraction (XRD) measurement of the negative electrode active layer, $I_{110}$ represents the area of the peak representing the [1,1,0] crystal face in an X-ray diffraction (XRD) measurement of the negative electrode active layer.

The negative electrode for lithium secondary battery according to the present disclosure includes a negative electrode active layer containing a carbon-based active material on at least one surface of the negative electrode current collector. The negative electrode active layer is a layer implementing the electrical activity of a negative electrode, and is prepared by applying an electrode slurry including a negative electrode active material implementing an electrochemical redox reaction during charging and discharging of a battery to both sides of an electrode current collector, and then drying and rolling the electrode slurry. The negative electrode active layer includes carbon-based active material as the negative electrode material to implement electrical activity through reversible oxidation-reduction reactions during charging and discharging of the battery. Specifically, the carbon-based active material refers to a material whose main component is carbon atoms, and as the carbon-based active material, graphite may be included. The graphite may include one or more of natural graphite and synthetic graphite, but preferably includes natural graphite or a mixture of natural graphite and synthetic graphite.

The carbon-based active material is preferably a spherical graphite assembly formed by aggregation of a plurality of flake graphite. The flake graphite can be natural graphite, artificial graphite, mesophase calcined carbon (bulk mesophase) made from tar and pitch, graphitized cokes (raw coke, green coke, pitch coke, needle coke, petroleum coke, etc.), and the like, and in particular, it is preferred to be assembled using a plurality of highly crystalline natural graphite. In addition, one graphite assembly may be formed from 2 to 100 pieces of flake-shaped graphite, preferably 3 to 20 pieces.

Such carbon-based active materials, specifically graphite, may have a spherical particle shape, wherein the sphericity of the graphite particles may be greater than or equal to 0.75, such as 0.75 to 1.0; 0.75 to 0.95; 0.8 to 0.95; or 0.90 to 0.99. Here, "sphericity" may mean the ratio of the shortest diameter (short diameter) to the longest diameter (long diameter) of any diameter passing through the center of the particle, wherein a sphericity of 1 means that the particle has a spherical shape. The sphericity can be measured using a particle shape analyzer. By making the shape of the carbon-based active material closer to spherical, the present disclosure can implement a high electrical conductivity of the negative electrode active layer, thereby improving the capacity of the battery and increasing the specific surface area of the negative electrode material, which can improve the adhesion between the negative electrode active layer and the current collector.

Further, the carbon-based active material may have an average particle diameter (D50) of 0.5 μm to 10 μm, and more specifically, may have an average particle diameter (D50) of 2 μm to 7 μm; 0.5 μm to 5 μm; or 1 μm to 3 μm.

The average particle diameter of a spherical natural graphite can be advantageous to have a smaller particle diameter to maximize the disorder in the swelling direction for each particle to prevent the particles from swelling due to the charging of lithium ions. However, if the particle diameter of the natural graphite is less than 0.5 μm, a large amount of binder is required due to the increase in the number of particles per unit volume, and the sphericity and spherization yield may decrease. On the other hand, if the maximum particle diameter exceeds 10 μm, the expansion becomes excessive, and as charging and discharging are repeated, cohesion between the particles and cohesion between the particles and the current collector decrease, which can lead to a significant reduction in the cycle characteristics.

Meanwhile, the negative electrode active layer can have a structure consisting of two individual layers stacked together. Specifically, the negative electrode according to this invention can have a first negative electrode active layer provided on the negative electrode current collector, with a second negative electrode active layer provided on the first negative electrode active layer. Here, the first and second negative electrode active layers contain carbon-based active material, which can be the same or different in each layer.

Additionally, in order to increase the energy density of the negative electrode and increasing the wetting ability to the electrolyte, the alignment (O.I) of the carbon-based active material contained in each of the first and second negative electrode active layers and the internal porosity of the negative electrode active layer can be individually adjusted to satisfy specific ranges.

In general, when processes such as rolling are performed to increase the energy density of a negative electrode containing carbon-based active material, there is a limitation in that wetting ability to the electrolyte and lithium ion mobility are reduced due to the reduction in the size and proportion of pores distributed between the active materials and within the active material itself. However, the negative electrode according to the present disclosure can maintain flow paths for the electrolyte to move within the negative electrode active layer, even after rolling the negative electrode active layer to increase energy density, by reducing the disorder at the molecular level of the carbon-based active material contained in each layer. Here, "reducing the disorder at the molecular level of the carbon-based active material" means that the crystals of the active material composing the carbon-based active material particles are distributed with a certain directionality, which may be different from the carbon-based active material particles themselves being arranged within the negative electrode active layer in a certain direction.

As such, as the disorder of the carbon-based active material contained in each layer of the negative electrode is reduced, the alignment (O.I) of the carbon-based active material and the internal porosity of the negative electrode active layer may be adjusted to satisfy specific ranges.

Specifically, the negative electrode according to the present disclosure can have the carbon-based active material contained in the negative electrode active layer aligned at a certain angle with respect to the negative electrode current collector. This alignment of carbon-based active material can lower the disorder within the negative electrode active layer, forming flow paths for the electrolyte to move between the carbon-based active material composing the negative electrode active layer while also reducing electrode resistance. Here, the alignment (or orientation) of the carbon-based active material (for example, graphite) can be determined through crystal face analysis of the carbon-based active material contained in the negative electrode active layer.

As an example, the negative electrode active layer can have carbon-based active material aligned in a certain direction with respect to the negative electrode current collector, satisfying a carbon-based active material average alignment of 0.4 to 0.9 as represented by the following Equation 1 during X-ray diffraction (XRD) measurements of the negative electrode active layer:

$$O.I = I_{004}/I_{110} \qquad \text{[Equation 1]}$$

In Equation 1, $I_{004}$ represents the area of the peak representing the [0,0,4] crystal face in the X-ray diffraction (XRD) measurement of the negative electrode active layer, $I_{110}$ represents the area of the peak representing the [1,1,0] crystal face in an X-ray diffraction (XRD) measurement of the negative electrode active layer.

Equation 1 serves as an indicator of the degree of alignment of the crystal structure of the spherical carbon-based active material in a certain direction, specifically relative to the surface of the negative electrode current collector. More specifically, during X-ray diffraction measurements, the negative electrode active layer shows peaks for graphite, which is a carbon-based active material, at $2\theta=26.5\pm0.2°$, $42.4\pm0.2°$, $43.4\pm0.2°$, $44.6\pm0.2°$, $54.7\pm0.2°$, and $77.5\pm0.2°$. These represent the [0,0,2], [1,0,0], [1,0,1]R, [1,0,1]H, [0,0,4], and [1,1,0] crystal faces of the graphite contained in the negative electrode active layer. In addition, the peak at $2\theta=43.4\pm0.2°$ can be seen as an overlap of the peaks corresponding to the [1,0,1]R plane of carbon-based materials and the [1,1,1] plane of current collectors, such as Cu.

Among these, the ratio of the area of the peak at $2\theta=77.5\pm0.2°$, representing the [1,1,0] plane, to the peak at $2\theta=54.7\pm0.2°$, representing the [0,0,4] plane, specifically the ratio of the areas obtained by integrating the intensity of these peaks, can measure the degree of alignment (O.I) of the carbon-based active material. Since the peak at $2\theta=54.7\pm0.2°$ represents the [0,0,4] plane of graphite, which has a slope relative to the negative electrode current collector, the alignment degree (O.I) suggests that values closer to 0 indicate an slope of approximately 90° relative to the surface of the negative electrode current collector, and higher values suggest a slope closer to 0° or 180°. In this aspect, the negative electrode active layer according to the present disclosure can have the carbon-based active material aligned nearly perpendicular to the negative electrode current collector, for example, at angles of 60° or more, 70° or more, 70°~90°, 80°~90°, 65°~85°, or 70°~85°, resulting in a lower alignment O.I compared to cases where the carbon-based active material is not vertically aligned.

Furthermore, the negative electrode of the present disclosure can have the carbon-based active material contained in both the first and second negative electrode active layers aligned in a certain direction relative to the negative electrode current collector, allowing the carbon-based active materials contained in the first and second active layers to have different alignments (O.I). Specifically, the carbon-based active material in the first negative electrode active layer can have a higher alignment (O.I) than that in the second negative electrode active layer.

As an example, the alignment ($O.I_{1st}$) of the carbon-based active material contained in the first negative electrode active layer can have a ratio of 105% to 150% to the alignment ($O.I_{2nd}$) of the carbon-based active material contained in the second negative electrode active layer, more specifically, a ratio of 110% to 140%; or 110% to 130%.

In this case, the alignment ($O.I_{2nd}$) of the carbon-based active material contained in the second negative electrode active layer may be from 0.4 to 0.9, more specifically, from 0.5 to 0.8; 0.6 to 0.8; 0.4 to 0.7; 0.4 to 0.6; or 0.70 to 0.85.

By controlling the alignment (O.I) of the carbon-based active material contained in both the first and second negative electrode active layers as described, the negative electrode according to the present disclosure may reduce the disorder of the carbon-based active materials contained in each negative electrode active layer. Thus, the negative electrode can maintain flow paths for the electrolyte within the negative electrode active layer even after the rolling process, exhibiting high wetting ability to the electrolyte even with a low proportion of internal pores.

As an example, the negative electrode according to the present disclosure may satisfy the following Equation 2 when evaluating the electrolyte wetting ability of the negative electrode active layer by dropping a single drop (2~5 µl) of polycarbonate (PC), a major component of the electrolyte, onto the outermost second negative electrode active layer:

$$1 \leq WT/O.I_{2nd} \leq 16 \qquad \text{[Equation 2]}$$

In Equation 2,

WT represents the time (unit: seconds) it takes for 1 drop (2-5 µl) of polycarbonate to impregnate a unit area (1 cm×1 cm) of the negative electrode, and $O.I_{2nd}$ represents the alignment of the carbon-based active material contained in the second negative electrode active layer.

Specifically, the negative electrode according to the present disclosure may satisfy Equation 2 within a range of 1 to 16 (i.e., $1 \leq WT/O.I_{2nd} \leq 16$), and more specifically, it may satisfy within a range of 3.5 to 16 (i.e., $3.5 \leq WT/O.I_{2nd} \leq 16$); 7.5 to 15 (i.e., $7.5 \leq WT/O.I_{2nd} \leq 15$); 4 to 12 (i.e., $4 \leq WT/O.I_{2nd} \leq 12$); 5 to 10 (i.e., $5 \leq WT/O.I_{2nd} \leq 10$); 5 to 9 (i.e., $5 \leq WT/O.I_{2nd} \leq 9$); 9 to 12 (i.e., $9 \leq WT/O.I_{2nd} \leq 12$); 11 to 15.5 (i.e., $11 \leq WT/O.I_{2nd} \leq 15.5$); or 9.5 to 15.5 (i.e., $9.5 \leq WT/O.I_{2nd} \leq 15.5$).

Equation 2 represents a parameter showing the correlation between the disorder of the carbon-based active material contained in the second negative electrode active layer and the electrolyte wetting ability of the second negative electrode active layer. Equation 2 comprises the alignment ($O.I_{2nd}$) of the carbon-based active material and the impregnation time of polycarbonate (PC), which is the main component of the electrolyte, and the negative electrode of the present disclosure, by satisfying Equation 2 in the above range, can maintain a flow path for the movement of the electrolyte inside even after rolling of the negative electrode active layer, so that the electrolyte wetting ability of the negative electrode active layer can be improved, and at the same time, the energy density can be further improved.

Furthermore, the negative electrode according to the present disclosure can have a small ratio of pores formed in the negative electrode active layer. While the pores contained inside and outside the negative electrode active layer can be impregnated with electrolyte, providing a moving path for lithium-ions during charging and discharging, but an excessive porosity ratio may reduce the energy density of the battery. Therefore, by rolling the negative electrode active layer with reduced disorder, the negative electrode according to the present disclosure can implement a low porosity, thereby further increasing the energy density of the negative electrode.

Here, the negative electrode active layer, especially the second negative electrode active layer, may have a porosity of 10% to 30%, specifically, 15% to 25%; 18% to 25%; 20% to 25%; or 21% to 24%.

In this case, the second negative electrode active layer may exhibit a BET specific surface area of 0.62 $m^2/g$ or less, specifically, 0.615 $m^2/g$ or less, 0.6 $m^2/g$ or less, 0.5 $m^2/g$ or less, 0.20 to 0.62 $m^2/g$, 0.30 to 0.62 $m^2/g$, 0.40 to 0.62 $m^2/g$, 0.40 to 0.60 $m^2/g$, 0.40 to 0.55 $m^2/g$, 0.40 to 0.50 $m^2/g$, or 0.58 to 0.62 $m^2/g$. Here, the specific surface area can be measured using the Brunauer-Emmett-Teller (BET) method. For example, it can be measured by the BET six-point method by the nitrogen gas adsorption distribution method using a porosimetry analyzer (Porosimetry analyzer; Bell Japan Inc, Belsorp-II mini).

By adjusting the porosity and/or BET specific surface area of the second negative electrode active layer, which is located at the outermost part among the negative electrode active layers and is in direct contact with the electrolyte, to the above range, the energy density of the negative electrode can be further increased without degradation of the electrolyte wetting ability of the negative electrode active layer.

Meanwhile, the average thickness of the negative electrode active layer may range from 50 μm to 300 μm, more specifically, from 50 μm to 250 μm, 100 μm to 250 μm, or 100 μm to 200 μm. By adjusting the average thickness of the negative electrode active layer within these ranges, not only can the energy density of the electrode be increased, but the disorder of the carbon-based active material contained in the active layer can also be uniformly controlled.

Additionally, the negative electrode active layer according to the present disclosure may selectively further include, along with the main component, which is the negative electrode active material, a conductive material, a binder, and other additives as needed.

The conductive material may include one or more of carbon black, acetylene black, Ketjen black, carbon nanotubes, carbon fibers, etc., but it is not limited to thereto.

As an example, the negative electrode active layer may contain carbon black, carbon nanotubes, carbon fibers, or the like as a conductive material alone or in combination.

Here, the content of the conductive material may be 0.1 to 10 parts by weight with respect to the total 100 parts by weight of the negative electrode active layer, more specifically, 0.1 to 8 parts by weight, 0.1 to 5 parts by weight, 0.1 to 3 parts by weight, 2 to 6 parts by weight, or 0.5 to 2 parts by weight. By controlling the content of conductive material within these ranges, the present disclosure may prevent an increase in the resistance of the negative electrode due to a low content of conductive material, which could reduce charging capacity, and avoid problems such as a reduction in charging capacity due to an excessive amount of conductive material which reduces the content of the negative electrode active material, or deteriorating quick charging characteristics due to an increase in the loading amount of the negative electrode active layer.

Furthermore, the binder is a component that assists in the coupling of the active material and conductive material and coupling to the current collector, and may be applied within a range that does not degrade the electrical properties of the electrode. Specifically, it may include one or more selected from a group consisting of vinylidene fluoride-hexafluoropropylene copolymer (PVDF-co-HFP), polyvinylidene fluoride (PVdF), polyacrylonitrile, polymethyl methacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polyacrylic acid, ethylene-propylene-diene monomer, sulfonated ethylene-propylene-diene monomer, styrene-butadiene rubber, and fluororubber.

The binder content in the negative electrode active layer may range from 0.1 to 10 parts by weight with respect to the total 100 parts by weight of the negative electrode active layer, more specifically, it may be 0.1 to 8 parts by weight, 0.1 to 5 parts by weight, 0.1 to 3 parts by weight, or 2 to 6 parts by weight. By controlling the binder content within these ranges, the present disclosure can prevent the reduction in adhesion of the active layer due to a low content of binder or the degradation in the electrical properties of the electrode due to an excessive amount of binder.

Furthermore, the negative electrode current collector is not specifically limited as long as it does not induce chemical changes in the battery while possessing high conductivity. For example, copper, stainless steel, nickel, titanium, and graphitized carbon may be used, and in the case of copper or stainless steel, those that are surface treated with carbon, nickel, titanium, silver, etc., may be used. Moreover, considering the conductivity and total thickness of the negative electrode to be manufactured, the average thickness of the negative electrode current collector may appropriately be applied within the range of 1 to 500 μm.

Lithium Secondary Battery

Furthermore, in an exemplary embodiment, the present disclosure provides a lithium secondary battery including an electrode assembly that includes the above-described negative electrode of the present disclosure, a positive electrode, and a separator placed between the positive electrode and the negative electrode.

The lithium secondary battery according to the present disclosure includes an electrode assembly with a plurality of positive electrodes, separators, and negative electrodes sequentially arranged; and an electrolyte composition containing lithium salts and electrolyte additives dissolved in a non-aqueous organic solvent. Here, the lithium secondary battery features a structure in which the first and second negative electrode active layers are sequentially stacked on the negative electrode current collector, where the alignment (O.I) of the carbon-based active material contained in the second negative electrode active layer is lower than that of the carbon-based active material contained in the first negative electrode active layer, and the second negative electrode active layer is equipped with a lower proportion of pores.

Accordingly, the lithium secondary battery not only exhibits excellent electrolyte wetting ability, but also can implement a high energy density.

Here, the negative electrode has the same configuration as the above-mentioned configuration, thus a detailed description is omitted.

Additionally, the positive electrode is provided with a positive electrode active layer manufactured by applying, drying, and pressing a slurry including a positive electrode active material on a positive electrode current collector, and may optionally further include a conductive material, a binder, and other additives as needed.

The positive electrode active material is a material that can electrochemically react on the positive electrode current collector, and may include one or more types of lithium metal oxides capable of reversibly intercalating and deintercalating lithium ions, represented by the following Chemical Formulas 1 and 2:

$$Li_x[Ni_yCO_2Mn_wM^1_v]O_2 \qquad \text{[Chemical Formula 1]}$$

$$LiM^2_pMn_qP_rO_4 \qquad \text{[Chemical Formula 2]}$$

In Chemical Formulas 1 and 2, $M^1$ is one or more elements selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo, x, y, z, w, and v are $1.0 \leq x \leq 1.30$, $0.5 \leq y < 1$, $0 < z \leq 0.3$, $0 < w \leq 0.3$, $0 \leq v \leq 0.1$, respectively, where $y+z+w+v=1$, $M^2$ is Ni, Co, or Fe, p is $0.05 \leq p \leq 1.0$, q is either 1-p or 2-p, and r is 0 or 1.

The lithium metal oxides represented by Chemical Formulas 1 and 2 contain high amounts of nickel (Ni) and manganese (Mn), respectively, and when used as positive electrode materials, offer the advantage of being able to stably supply high capacity and/or high voltage electricity.

Here, examples of lithium metal oxides represented by Chemical Formula 1 include $LiNi_{0.8}Co_{0.1}Mn_{0.102}$, $LiNi_{0.6}Co_{0.2}Mn_{0.202}$, $LiNi_{0.9}Co_{0.05}Mn_{0.05}O_2$, $LiNi_{0.6}Co_{0.2}Mn_{0.1}Al_{0.1}O_2$, $LiNi_{0.6}Co_{0.2}Mn_{0.15}Al_{0.05}O_2$, $LiNi_{0.7}Co_{0.1}Mn_{0.1}Al_{0.1}O_2$, etc., and lithium metal oxides represented by Chemical Formula 2 may include $LiNi_{0.7}Mn_{1.3}O_4$; $LiNi_{0.5}Mn_{1.5}O_4$; $LiNi_{0.3}Mn_{1.7}O_4$, $LiFePO_4$, $LiFe_qMn_{1-q}PO_4$, etc., which may be used alone or in combination.

Additionally, the positive electrode active material may be included in an amount of 85 parts by weight or more based on the weight of the positive electrode active layer, specifically, 90 parts by weight or more, 93 parts by weight or more, or 95 parts by weight or more.

Furthermore, the positive electrode active layer may further include a conductive material, a binder, and other additives in addition to the positive electrode active material. Here, the conductive material is used to improve the electrical performance of the positive electrode, can be applied as commonly utilized in the industry, but specifically, it may include one or more types selected from a group consisting of natural graphite, synthetic graphite, carbon black, acetylene black, Denka black, Ketjen black, Super-P, channel black, furnace black, lamp black, summer black, graphene, and carbon nanotubes.

Moreover, the conductive material can be included in the amount of 0.1 to 5 parts by weight based on the weight of each positive electrode active layer, specifically may be included in the amount of 0.1 to 4 parts by weight; 2 to 4 parts by weight; 1.5 to 5 parts by weight; 1 to 3 parts by weight; 0.1 to 2 parts by weight; or 0.1 to 1 part by weight.

Moreover, the binder serves to bind the positive electrode active material, positive electrode additives, and conductive material together, and it may be used without being limited as long as it possesses this function. Specifically, the binder may include one or more types of resins selected from a group consisting of polyvinylidene fluoride-hexafluoropropylene copolymer (PVdF-co-HFP), polyvinylidene fluoride (PVdF), polyacrylonitrile, polymethylmethacrylate, and copolymers thereof. As an example, the binder may include polyvinylidenefluoride (PVdF).

In addition, the binder may be included in an amount of 1 to 10 parts by weight based on the weight of each positive electrode active layer, specifically may be included in the amount of 2 to 8 parts by weight; or 1 to 5 parts by weight.

The total thickness of the positive electrode active layer is not specifically limited, but it may be from 50 μm to 300 μm, more specifically, 100 μm to 200 μm; 80 μm to 150 μm; 120 μm to 170 μm; 150 μm to 300 μm; 200 μm to 300 μm; or 150 μm to 190 μm.

Moreover, as a positive electrode current collector, the positive electrode may use one that does not induce chemical changes in the battery while possessing high conductivity. For example, stainless steel, aluminum, nickel, titanium, vitreous carbon, etc. may be used, and in cases of aluminum or stainless steel, those that are surface treated with carbon, nickel, titanium, silver, etc., may be used. Additionally, the average thickness of the current collector can be appropriately applied from 3 to 500 μm, considering the conductivity and total thickness of the positive electrode to be manufactured.

Meanwhile, the separator interposed between the positive electrode and negative electrode of each unit cell is an insulating thin film with high ion permeability and mechanical strength. It is not particularly limited as long as it is conventionally used in the industry, but specifically may use those including one or more types of polymers such as chemically resistant and hydrophobic polypropylene; polyethylene; polyethylene-propylene copolymer. The separator may have the form of a porous polymeric substrate, such as a sheet or nonwoven fabric including the polymer described above, and in some cases may have the form of a composite separator in which organic or inorganic particles are coated by an organic binder on the porous polymeric substrate. Furthermore, the separator may have an average pore diameter of 0.01 to 10 μm, and an average thickness of 5 to 300 μm.

Meanwhile, the lithium secondary battery according to the present disclosure is not specifically limited but may take the form of a secondary battery that includes a stack type; zigzag type; or zigzag-stack type electrode assembly. For instance, the lithium secondary battery according to the present disclosure may be a pouch-type secondary battery or a prismatic secondary battery.

Manufacturing Method of Negative Electrode

In addition, in an exemplary embodiment, the present disclosure provides a manufacturing method of a negative electrode for lithium secondary battery including:

applying a first negative electrode slurry containing carbon-based active material on a negative electrode current collector;

applying a second negative electrode slurry containing carbon-based active material on the applied first negative electrode slurry;

applying a magnetic field to the first and second negative electrode slurries; and drying the first and second negative electrode slurries applied with a magnetic field to form the first and second negative electrode active layers, wherein the alignment ($O.I_{1st}$) of the carbon-based active material in the first negative electrode active layer formed, represented by the following Equation 1, is greater than the alignment ($O.I_{2nd}$) of the carbon-based active material in the second negative electrode active layer, and the porosity of the second negative electrode active layer is from 15% to 25%:

$$O.I = I_{004}/I_{110} \qquad \text{[Equation 1]}$$

In Equation 1, $I_{004}$ represents the area of the peak representing the [0,0,4] crystal face in the X-ray diffraction (XRD) measurement of the negative electrode active layer, $I_{110}$ represents the area of the peak representing the [1,1,0] crystal face in an X-ray diffraction (XRD) measurement of the negative electrode active layer.

The manufacturing method of a negative electrode according to the present disclosure involves applying a negative electrode slurry containing carbon-based active material onto a negative electrode current collector and then applying a magnetic field to the surface of the applied slurry to align the carbon-based active material within the negative electrode slurry at a certain angle relative to the surface of the negative electrode current collector (or to the transfer direction of electrode sheet), reducing the disorder of the carbon-based active material. The negative electrode can then be prepared by successively drying the negative electrode slurry with less disordered carbon-based active material to form a negative electrode active layer.

Here, the application of the negative electrode slurry can be performed in two steps. Specifically, the application of the negative electrode slurry may include applying a first negative electrode slurry containing carbon-based active material onto the current collector, and applying a secondary negative electrode slurry containing carbon-based active material on the applied first negative electrode slurry.

At this time, the carbon-based active material included in first negative electrode slurry and the second negative electrode slurry, respectively, may be the same or different, and if each carbon-based active material is the same, the conductive material, binder, and additives included in each negative electrode slurry may vary, or the content ratio of the carbon-based active material contained in the corresponding negative electrode slurry may differ.

In addition, application of both the first and second negative electrode slurries may be applied without being specifically limited as long as it is any conventionally applied method in the industry.

Moreover, applying a magnetic field to both the first and second negative electrode slurries may be a step of reducing a disorder such that the crystal faces of the carbon-based active material contained in each negative electrode slurry have a predetermined angle with respect to the negative electrode current collector. For this purpose, applying a magnetic field may apply a magnetic field to the surface of the negative electrode slurries applied sequentially on the negative electrode current collector, that is, to the surface of the exposed second negative electrode slurry, such that the first negative electrode slurry located in the lower part of the second negative electrode slurry is also reduced in disorder by the applied magnetic field.

Here, the degree of disorder of the carbon-based active material contained in each negative electrode slurry can be adjusted by the strength of the magnetic field applied, the duration of exposure to magnetic field, and the like.

For instance, applying the magnetic field may apply a magnetic field of 2,000 G (Gauss) to 6,000 G (Gauss), more specifically, a magnetic field of 2,500 G to 5,500 G; 3,000 G to 5,500 G; 3,500 G to 5,500 G; 4,000 G to 5,500 G; 3,500 G to 4,500 G; or 4,500 G to 5,000 G.

Furthermore, applying the magnetic field may be performed for a period of 5 seconds to 60 seconds, more specifically for a period of 10 seconds to 60 seconds; 10 seconds to 30 seconds; 30 seconds to 60 seconds; 40 seconds to 50 seconds; 15 seconds to 35 seconds; or 10 seconds to 50 seconds.

In one example, applying the magnetic field may include applying a magnetic field of 4,700±100 G to the negative electrode slurry for 12 seconds to 33 seconds.

By applying a magnetic field to the second negative electrode slurry to satisfy the magnetic field strength and application time described above in the step of applying the magnetic field, the present disclosure can simultaneously reduce the disorder of the carbon-based active material in the second negative electrode slurry as well as the first negative electrode slurry located in the lower part of the second negative electrode slurry.

Further, the step of forming the first negative electrode active layer and the second negative electrode active layer may include: drying the first negative electrode slurry and the second negative electrode slurry; and rolling the dried first negative electrode slurry and the second negative electrode slurry.

Here, the step of drying the first negative electrode slurry and the second negative electrode slurry may be applied in any manner that can maintain the alignment of the carbon-based active material contained within the negative electrode active layer, without being particularly limited.

For example, the drying may be performed by applying thermal energy to the negative electrode slurry using a hot air dryer, a vacuum oven, or the like to dry the negative electrode slurry.

Moreover, rolling the dried negative electrode slurry is a step of increasing the density of the negative electrode active layer by applying pressure to the dried negative electrode slurry using a roll press or the like. In this case, the rolling may be performed at a temperature condition higher than room temperature.

Specifically, the rolling may be performed at a temperature of 50° C. to 100° C., more specifically at a temperature of 60° C. to 100° C.; 75° C. to 100° C.; 85° C. to 100° C.; 50° C. to 90° C.; 60° C. to 80° C.; or 65° C. to 90° C. Specifically, the rolling may be performed at a rolling speed of 2 m/s to 7 m/s, or more specifically, 2 m/s to 6.5 m/s; 2 m/s to 6 m/s; 2 m/s to 5.5 m/s; 2 m/s to 5 m/s; 2 m/s to 4.5 m/s; 2 m/s to 4 m/s; 2.5 m/s to 4 m/s; 2.5 m/s to 3.5 m/s; 3.5 m/s to 5 m/s; 5 m/s to 7 m/s; 5.5 m/s to 6.5 m/s; or 6 m/s to 7 m/s. Furthermore, the rolling may be performed under a pressure condition of 50 MPa to 200 MPa, more specifically, under a pressure condition of 50 MPa to 150 MPa; 50 MPa to 100 MPa; 100 MPa to 200 MPa; 150 MPa to 200 MPa; or 80 MPa to 140 MPa.

By performing the rolling of the dried negative electrode slurry under the above temperature, speed and/or pressure conditions, the present disclosure can increase the energy density of the negative electrode while minimizing the change in the alignment of the carbon-based active materials contained in the first negative electrode active layer and the second negative electrode active layer formed.

Meanwhile, the carbon-based active material contained in the negative electrode slurry may include a carbon-based active material conventionally applied as a carbon-based active material in a lithium secondary battery. Specifically, the carbon-based active material refers to a material having carbon atoms as its main component, and such carbon-based active material may include graphite. The graphite may include one or more of natural graphite, synthetic graphite, but preferably natural graphite, or a mixture of natural and synthetic graphite.

In addition to the carbon-based active material, the negative electrode slurry may further include a conductive material, a binder, a thickener, and the like, which may be applied as is customary in the art.

EXAMPLES

Hereinafter, the present disclosure will be described in more detail by way of examples and experimental examples.

However, the following examples and experimental examples are only illustrative of the present disclosure, and the contents of the present disclosure are not limited to the following examples and experimental examples.

Examples 1 to 3 and Comparative Examples 1 to 2:
Preparation of a Negative Electrode for a Lithium
Secondary Battery A negative electrode for lithium secondary battery was prepared by reflecting the conditions shown in Table 1 below.

First, natural graphite and synthetic graphite were prepared as carbon-based active materials (average particle size: 4±1 μm, sphericity: 0.94±0.2), and a first negative electrode slurry and a second negative electrode slurry were prepared using the prepared carbon-based active materials.

Specifically, the first negative electrode slurry was prepared by mixing natural graphite and synthetic graphite in a 2:8 weight ratio to prepare it as a negative electrode active material, carbon black was prepared as a conductive material and carboxymethylcellulose (CMC) and styrene butadiene rubber (SBR) were prepared as binders. A first negative electrode slurry was prepared by mixing 95 parts by weight of mixed graphite, 1 part by weight of carbon black, 1.5 parts by weight of carboxymethylcellulose (CMC), and 2.5 parts by weight of styrene butadiene rubber (SBR) with water to achieve 50% solids.

In addition, the second negative electrode slurry was prepared by the same method as the first negative electrode slurry, but using only synthetic graphite as the carbon-based active material.

Once each negative electrode slurry was prepared, the first negative electrode slurry and the second negative electrode slurry were sequentially cast onto a copper thin plate (thickness: 8 μm) under roll-to-roll transfer (transfer speed: 5 m/min) using a die coater. At this time, the first negative electrode slurry and the second negative electrode slurry were cast so that the average thickness of the first and second negative electrode slurries was 125±5 μm, respectively, along the transfer direction of the copper thin plate.

Then, a magnetic field of 4,700±100 G was applied to the surface of the applied second negative electrode slurry as shown in Table 1, and the negative electrode slurry with the magnetic field applied was hot air dried to form a negative electrode active layer. The formed negative electrode active layer was rolled at 50±1° C. with a transfer rate of 3 m/s and the pressure shown in Table 1 to prepare a negative electrode for lithium secondary battery.

X-ray diffraction spectroscopy (XRD) of the first negative electrode active layer and the second negative electrode active layer was performed on the prepared negative electrodes to measure the spectra. For the first negative electrode active layer, the second negative electrode active layer was removed by peeling off the second negative electrode active layer after X-ray diffraction (XRD) measurement of the second negative electrode active layer, and X-ray diffraction was measured on the exposed surface of the first negative electrode active layer, and the measurement conditions of the X-ray diffraction (XRD) are as follows:

Target: Cu (Kα ray) graphite monochromator
Slit: Diverging slit=1 degree, receiving slit=0.1 mm, scattering slit=1 degree.
Measurement area: [1,1,0] plane: 76.5 degrees<2θ<78.5 degrees/[0,0,4] plane: 53.5 degrees<2θ<56.0 degrees.
From the spectra measured under the above conditions, the average alignment (O.I.) of each carbon-based active material was calculated according to Equation 1. The results are shown in Table 1.

$$O.I = I_{004}/I_{110} \qquad \text{[Equation 1]}$$

In Equation 1,
$I_{004}$ represents the area of the peak representing the [0,0,4] crystal face in the X-ray diffraction spectroscopy (XRD) measurement of the negative electrode active layer,
$I_{110}$ represents the area of the peak representing the [1,1,0] crystal face in an X-ray diffraction (XRD) measurement of the negative electrode active layer.
In addition, the porosity and BET specific surface area of the second negative electrode active layer were measured using BELSORP (BET equipment) of BEL JAPAN, and the porosity of the second negative electrode active layer was defined as follows:

Internal porosity=pore volume per unit mass/(specific volume+pore volume per unit mass)

TABLE 1

| | Magnetic field application time | Alignment (O.I) First negative electrode active layer | Alignment (O.I) Second negative electrode active layer | Rolling pressure | Second negative electrode active layer Porosity | Second negative electrode active layer BET specific surface area |
|---|---|---|---|---|---|---|
| Example 1 | 3 sec. | 1.85 | 1.54 | 100~150 MPa | 24.9 ± 1% | 0.619 m²/g |
| Example 2 | 15 sec. | 0.92 | 0.77 | 100~150 MPa | 23.7 ± 1% | 0.450 m²/g |

TABLE 1-continued

| | | Alignment (O.I) | | | Second negative | |
| | Magnetic field | First negative | Second negative | | electrode active layer | |
| | application time | electrode active layer | electrode active layer | Rolling pressure | Porosity | BET specific surface area |
| --- | --- | --- | --- | --- | --- | --- |
| Example 3 | 30 sec. | 0.75 | 0.62 | 100~150 MPa | 22.5 ± 1% | 0.420 m$^2$/g |
| Comparative Example 1 | 15 sec. | 0.99 | 0.83 | 220~250 MPa | 12.2 ± 1% | 0.297 m$^2$/g |
| Comparative Example 2 | 15 sec. | 0.89 | 0.74 | 20~40 MPa | 26.5 ± 1% | 0.734 m$^2$/g |

In addition, among the prepared negative electrodes, a Fourier transform scanning electron microscopy-energy dispersive spectroscopy (FT-SEM/EDS) analysis of the cross-section was performed on the negative electrodes prepared in Example 2, the results of which are shown in FIG. 2. In this case, the scanning electron microscopy analysis was performed at an accelerating voltage of 5.0 kV at a magnification of 700 and is shown in (A) of FIG. 2, and the elemental analysis of carbon contained in the negative electrode active layer by energy dispersive spectroscopy (EDS) was performed, and the state of the pores contained in the negative electrode active layer is shown in (B) of FIG. 2.

Comparative Example 3. Preparation of a Negative Electrode for a Lithium Secondary Battery A negative electrode for a lithium secondary battery was prepared by the same method as in Example 2, except that a magnetic field was not applied after casting of the second negative electrode slurry.

The first negative electrode active layer and the second negative electrode active layer of the prepared negative electrode had an alignment (O.I.) of carbon-based active materials of 5.41 and 16.87, respectively. In addition, the porosity and BET specific surface area of the second negative electrode active layer were 27±1% and 0.626 m$^2$/g, respectively.

Fourier transform scanning electron microscopy-energy dispersive spectroscopy (FT-SEM/EDS) analysis was performed on the cross-section of the prepared negative electrode, and the results are shown in FIG. 3. In this case, the scanning electron microscopy analysis was performed at an accelerating voltage of 5.0 kV at a magnification of 700 and is shown in (A) of FIG. 3, and the elemental analysis of carbon contained in the negative electrode active layer by energy dispersive spectroscopy (EDS) was performed, and the state of the pores contained in the negative electrode active layer is shown in (B) of FIG. 3.

Comparative Example 4. Preparation of a Negative Electrode for a Lithium Secondary Battery A negative electrode for a lithium secondary battery having a monolayer structure of negative electrode active layer was prepared by the same method as in Example 2, except that only the second negative electrode slurry was cast on a copper thin plate (thickness: 8 μm) using a die-coater to achieve an average thickness of 250±10 μm.

The negative electrode active layer of the prepared negative electrode had a carbon-based active material alignment (O.I.) of 0.79, and the porosity and BET specific surface area were 23.5±1% and 0.44 m$^2$/g, respectively.

Comparative Example 5. Preparation of a Negative Electrode for a Lithium Secondary Battery A negative electrode for a lithium secondary battery having a bilayer structure of negative electrode active layer was prepared by the same method as in Example 2, except that a first negative electrode slurry was cast on a copper thin plate (thickness: 8 μm) using a die-coater to achieve an average thickness of 125±5 μm, a magnetic field of 6,500±100 G was applied to the surface of the first negative electrode slurry for 15 seconds, and a second negative electrode slurry was cast on the first negative electrode slurry applied with a magnetic field to have an average thickness of 125±5 μm.

The first negative electrode active layer and the second negative electrode active layer of the prepared negative electrode had an alignment (O.I.) of the carbon-based active material of 0.49 and 0.78, respectively, and the porosity and BET specific surface area of the second negative electrode active layer were 22.3±1% and 0.415 m$^2$/g, respectively.

Examples 4 to 6 and Comparative Examples 6 to 10. Preparation of Lithium Secondary Battery LiNi$_{0.7}$Co$_{0.1}$Mn$_{0.1}$Al$_{0.1}$O$_2$ with a particle size of 5 μm was prepared as a positive electrode active material, mixed with polyvinylidene fluoride as a carbon-based conductive material and binder in a weight ratio of 94:3:3 in N-methyl pyrrolidone (NMP) to form a slurry, cast on an aluminum thin plate, dried in a vacuum oven at 120° C., and rolled to prepare a positive electrode.

An 18 μm polypropylene separator was interposed between the positive electrode obtained above and the negative electrode prepared in Examples 1-3 and Comparative Examples 1-3 to 5, respectively, and inserted into a case, and then a lithium secondary battery was assembled by injecting an electrolyte composition.

The type of negative electrode applied to each lithium secondary battery is shown in Table 2 below.

TABLE 2

| | Type of negative electrode applied |
| --- | --- |
| Example 4 | Negative electrode prepared in Example 1 |
| Example 5 | Negative electrode prepared in Example 2 |
| Example 6 | Negative electrode prepared in Example 3 |

TABLE 2-continued

| | Type of negative electrode applied |
|---|---|
| Comparative Example 6 | Negative electrode prepared in Comparative Example 1 |
| Comparative Example 7 | Negative electrode prepared in Comparative Example 2 |
| Comparative Example 8 | Negative electrode prepared in Comparative Example 3 |
| Comparative Example 9 | Negative electrode prepared in Comparative Example 4 |
| Comparative Example 10 | Negative electrode prepared in Comparative Example 5 |

EXPERIMENTAL EXAMPLES

The following experiments were performed to evaluate the electrolyte wetting ability and energy density of the negative electrode according to the present disclosure.

a) Evaluation of Electrolyte Wetting Ability

A drop of polycarbonate (PC) (2~4 µl) was dropped to the surface of the second negative electrode active layer of the negative electrode prepared in Examples 1-3 and Comparative Examples 1-5, and the time taken for the drop to be completely impregnated with the second negative electrode active layer was measured. Here, the shorter the impregnation time of polycarbonate (PC), the better the electrolyte wetting ability of the negative electrode active layer, and the electrolyte wetting ability parameters of the negative electrode active layer were calculated using Equation 2 below from the measured values. The results are shown in Table 3 below:

$$\text{Wetting ability parameter} = WT/O.I_{2nd} \qquad \text{[Equation 2]}$$

In Equation 2,

WT represents the time (unit: seconds) it takes for 1 drop (2-5 µl) of polycarbonate to impregnate a unit area (1 cm×1 cm) of the negative electrode, and $O.I_{2nd}$ represents the alignment of the carbon-based active material contained in the second negative electrode active layer.

b) Evaluation of Energy Density

Each negative electrode prepared in Examples 1-3 and Comparative Examples 1-5 was drilled to have a hole with a size of 2 cm², and a constant current charge and discharge by the three-terminal method was performed to measure the charge and discharge capacity. Specifically, the energy density evaluation of each negative electrode was measured by making a sample cell containing each negative electrode as a sample electrode. Here, the sample cell was designed to have a structure comprising a laminate of each negative electrode, a separator, and a counter electrode, with a reference electrode introduced on the upper part separately. Furthermore, the sample cells were applied with a solution of LiPF$_6$ dissolved in a mixed solution of ethylene carbonate (EC) and methylethyl carbonate (MEC) (EC:MEC=1:2, vol.:vol.) to a concentration of 1 M as the electrolyte, and metal lithium was used as the counter electrode and reference electrode, and a polyethylene microporous membrane was used as the separator.

The obtained sample cells were charged to 0 V (V vs. Li/Li$^+$) with a constant current of 0.2 mA/cm² for the surface area of each negative electrode, and then discharged to 1 V (V vs. Li/Li$^+$) with a constant current of 0.2 mA/cm² for the surface area of each negative electrode, and the discharge capacity per unit volume and initial charge/discharge efficiency per unit volume of each sample cell was measured and calculated. The measured results are shown in Table 3 below.

TABLE 3

| | PC Impregnation time | WT/ O.I$_{2nd}$ | Initial charge/discharge efficiency [mAh/cm³%] |
|---|---|---|---|
| Example 1 | 5.8 sec. | 3.8 | 94.1 |
| Example 2 | 7.2 sec. | 9.4 | 94.5 |
| Example 3 | 9.3 sec. | 15.0 | 95.1 |
| Comparative Example 1 | 18.1 sec. | 21.8 | 93.5 |
| Comparative Example 2 | 5.5 sec. | 7.4 | 92.8 |
| Comparative Example 3 | 15.5 sec. | 0.9 | 93.6 |
| Comparative Example 4 | 6.2 sec. | 7.8 | 93.8 |
| Comparative Example 5 | 12.7 sec. | 16.3 | 93.7 |

As shown in Table 3 above, it can be seen that the negative electrode for lithium secondary battery according to the present disclosure not only has high electrolyte wetting ability, but also has a high energy density. Specifically, the negative electrodes prepared in the examples were found to have a short time to completely absorb polycarbonate (PC), a major component of the electrolyte (i.e., impregnation time), less than 10 seconds, and to have a high initial charge/discharge efficiency of about 94% or more.

This is because the negative electrodes of the examples have a structure in which a first negative electrode active layer and a second negative electrode active layer are sequentially stacked on the negative electrode current collector, but the alignment (O.I) of the carbon-based active material contained in the second negative electrode active layer is lower than the alignment of the carbon-based active material contained in the first negative electrode active layer, and when the second negative electrode active layer is provided with a low proportion of pores, it means that the negative electrode active layer can include a flow path through which the electrolyte can move inside the negative electrode active layer even after the rolling process of the negative electrode active layer, thereby implementing an excellent energy density while maintaining a high electrolyte wetting ability of the negative electrode active layer.

From these results, it can be seen that the electrolyte wetting ability of the negative electrode for the lithium secondary battery according to the present disclosure is excellent and the energy density is high.

Although the above has been described with reference to a preferred embodiment of the present disclosure, it will be understood by those skilled in the art or having ordinary knowledge in the art that various modifications and changes can be made to the present disclosure without departing from the field of thought and technology described in the following patent claims.

Accordingly, the technical scope of the present disclosure is not limited to what is described in the detailed description of the specification, but should be defined by the claims of the patent.

REFERENCE NUMERALS

100: NEGATIVE ELECTRODE FOR LITHIUM SECONDARY BATTERY PRESENT DISCLOSURE
110: NEGATIVE ELECTRODE CURRENT COLLECTOR
120: NEGATIVE ELECTRODE ACTIVE LAYER
121: FIRST NEGATIVE ELECTRODE ACTIVE LAYER
122: SECOND NEGATIVE ELECTRODE ACTIVE LAYER

The invention claimed is:

1. A negative electrode for lithium secondary battery comprising:

a negative electrode current collector; a first negative electrode active layer provided on at least one surface of the negative electrode current collector, the first negative electrode active layer containing carbon-based active material; and a second negative electrode active layer provided on the first negative electrode active layer, the second negative electrode active layer containing carbon-based active material, wherein the second negative electrode active layer has an alignment, $O.I_{2nd}$, of the carbon-based active material represented by Equation 1 of 0.4 to 0.9, wherein an alignment, $O.I_{1st}$, of the carbon-based active material contained in the first negative electrode active layer has a ratio of 105% to 150% with respect to the alignment, $O.I_{2nd}$, of the carbon-based active material contained in the second negative electrode active layer, and porosity of the second negative electrode active layer is from 15% to 25%:

$$O.I = I_{004}/I_{110} \qquad \text{[Equation 1]}$$

wherein, $I_{004}$ represents an area of a peak representing the [0,0,4] crystal face in an X-ray diffraction (XRD) measurement of the first or the second negative electrode active layer, $I_{110}$ represents an area of a peak representing the [1,1,0] crystal face in an X-ray diffraction (XRD) measurement of the first or the second negative electrode active layer, the carbon-based active material in the first negative electrode active layer and the carbon-based active material in the second negative electrode active layer have an average particle diameter D50 of 1 μm to 3 μm, and wherein the negative electrode is configured to satisfy the wetting ability to polycarbonate as represented by the following Equation 2:

$$1 \le WT/O.I_{2nd} \le 16 \qquad \text{[Equation 2]}$$

wherein,

WT represents a time in a unit of second it takes for 1 drop of polycarbonate containing 2-5 μl to impregnate an area of 1 $cm^2$ of the negative electrode.

2. The negative electrode for lithium secondary battery of claim 1, wherein a total thickness of the first and second negative electrode active layers is from 50 μm to 300 μm.

3. The negative electrode for lithium secondary battery of claim 1, wherein the second negative electrode active layer has a BET specific surface area of from 0.20 to 0.62 $m^2$/g.

4. The negative electrode for lithium secondary battery of claim 1, wherein the carbon-based active material includes at least one of natural graphite or synthetic graphite.

* * * * *